Sept. 26, 1950 J. E. BURRELL 2,523,556

SYNCHRONIZING CIRCUIT FOR TELEVISION RECEIVING EQUIPMENT

Filed April 26, 1945 2 Sheets-Sheet 1

INVENTOR
JOHN E. BURRELL
BY Ralph L. Chappell
ATTORNEY

Sept. 26, 1950 J. E. BURRELL 2,523,556

SYNCHRONIZING CIRCUIT FOR TELEVISION RECEIVING EQUIPMENT

Filed April 26, 1945 2 Sheets-Sheet 2

INVENTOR.

John E. Burrell

BY S. H. Helvestine

Attorney

Patented Sept. 26, 1950

2,523,556

UNITED STATES PATENT OFFICE 2,523,556

SYNCHRONIZING CIRCUIT FOR TELEVISION RECEIVING EQUIPMENT

John Eden Burrell, United States Navy

Application April 26, 1945, Serial No. 590,443

5 Claims. (Cl. 178—69.5)

(Granted under the act of March 3, 1883, as amended April 30, 1928; 370 O. G. 757)

This invention relates in general to synchronizing systems, and more particularly to a system for synchronizing a television transmitter and receiver.

It is well known in the prior art to synchronize a transmitter and receiver by sending synchronizing signals from the transmitter to the receiver, said signals operating upon the receiver to keep it in step with the transmitter. In television systems the picture is scanned by lines and frames, and it is necessary in order to reproduce the picture that the lines and frames of the receiver be synchronized with the lines and frames of the transmitter. The output of the transmitter and/or the input of the receiver is composed of picture or video signals during the interval in which a line is scanned, and of synchronizing signals during the intervals of fly-back of the cathode ray or light beam between line and frame scanning. Apparatus for accomplishing this is well known and one form widely used is described in detail in a paper by Smith and Bedford, RCA Review for July 1940, vol. 5, No. 1, pages 51–68, "A Precision Television Synchronizing Signal Generator." Another system is a paper by Wendt and Fredendall, I. R. E. January 1943, pages 7–15, "Automatic Frequency and Phase Control of Synchronization in Television Receivers."

While pictures can be successfully transmitted under favorable conditions as discussed above, one main limitation of the apparatus is the amount of distortion present under certain conditions of transmission, which may and often does result in loss of the picture. A large portion of this distortion is due to the improper functioning of the synchronizing system.

Applicant found while experimenting with airborne transmitters that it was practically impossible to obtain successful operation under those conditions, due to a breakdown in the functioning of the synchronizing system. Airborne equipments are more susceptible to synchronization troubles owing to vibrating effects on tubes and also variable multipath transmissions. If the receiver was brought into the vicinity of short wave pulses any operation that was obtained was immediately less satisfactory. In order to obtain successful operation, it is herein proposed to disconnect the synchronizing system of the prior art, and substitute therefor a modification of the synchronizing system that would operate successfully. Subsequent tests with both the transmitter and the receiver located on the ground, and actual flight tests of the receiver and transmitter, showed that the instant synchronizing system was superior to that of the prior art.

It is an object of this invention to provide a synchronizing system for television transmitters and receivers that will operate successfully under adverse conditions.

Another object is to provide a synchronizing system that will prevent the collapse of the picture in the horizontal or vertical direction due to noise or other unwanted signals.

Another object is to provide a synchronizing system that will prevent the collapse of the picture in the horizontal and vertical direction upon jamming.

Another object is to provide a synchronizing system in which the tearing of the picture due to improper synchronization control is eliminated.

Another object is to provide a synchronizing system in which a small degree of picture phase shift can be tolerated and wherein sufficient synchronizing information can be obtained from the video or picture signal to result in satisfactory synchronizing, thus eliminating the complexity and power-space requirements of super-sync systems.

Another object is to provide a synchronizing system in which the starting time of each line is more definitely related to its predecessor with resulting better resolution in areas even where unfavorable signal to noise conditions exist.

Another object is to provide a synchronizing system that will result in case of superimposition of video signals when two or more systems are combined.

Another object is to provide a synchronizing system in which studio switching can be effected without loss of picture during switching operation.

Another object is the provision of a synchronizing system which will be economical to manufacture, reliable in operation and which possesses all of the qualities of ruggedness and dependability in service.

Figure 1:
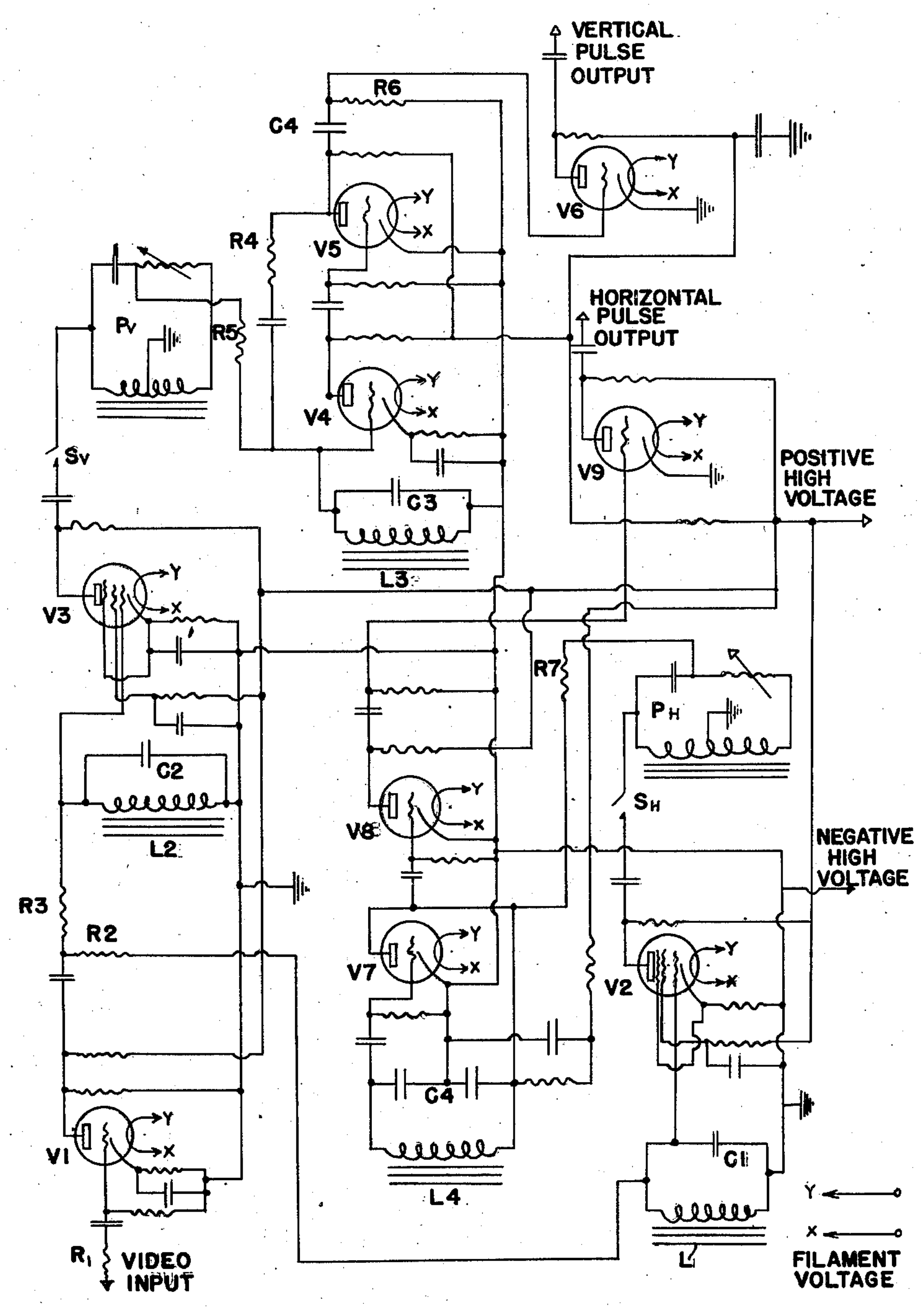
Fig. 1 is a schematic diagram of a television synchronization circuit according to the present invention.
Figure 2:
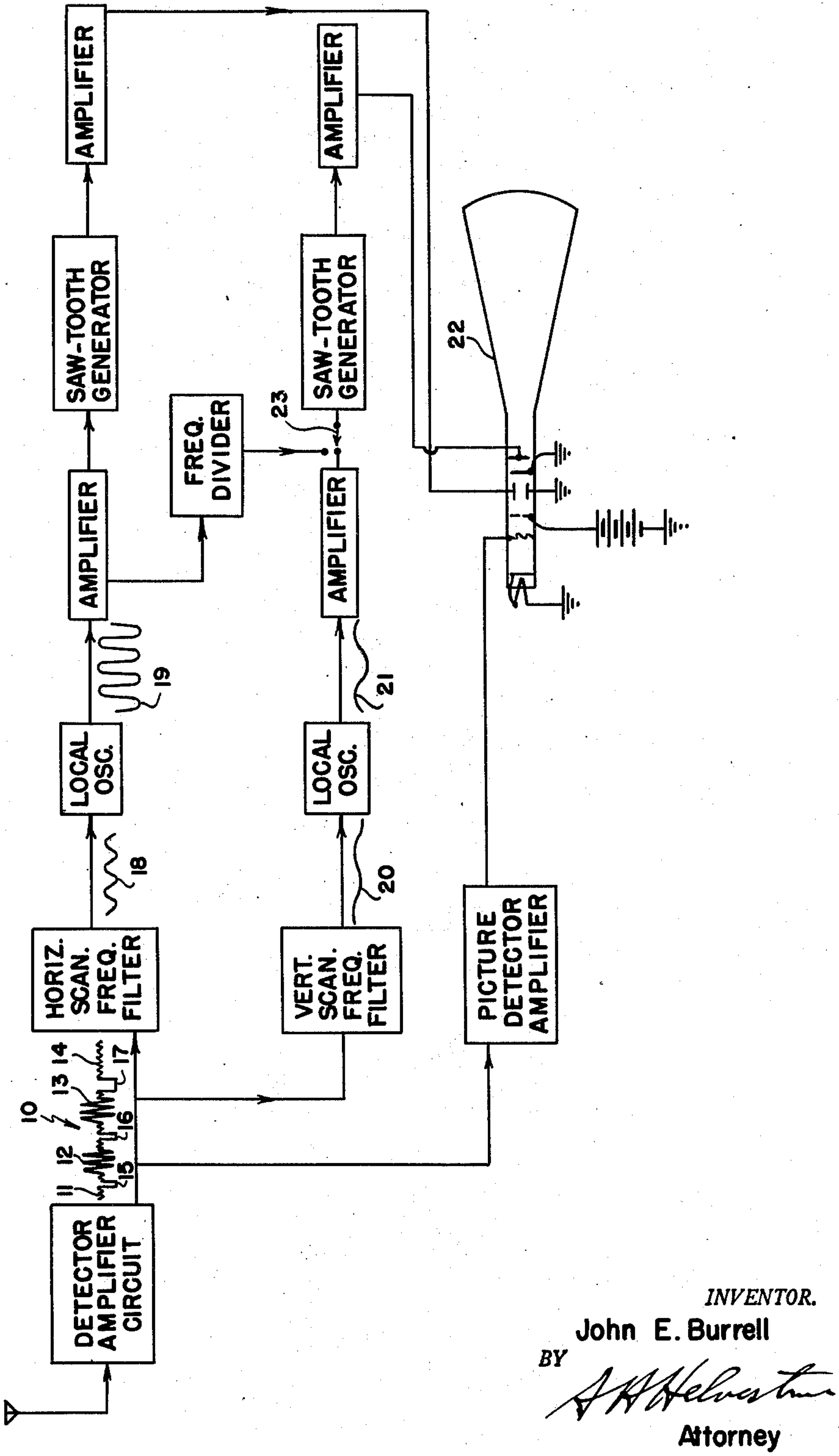
Fig. 2 is a block diagram of the circuit of Fig. 1 showing the relation thereof to other television receiver components.

In Fig. 2 numeral 10 illustrates generally a received composite video signal comprising image brightness variations such as 11, 12, 13, and 14, and blanking pulses 15, 16, and 17. A part of the signal may be noise, as for example at 13, when the signal is abnormal and might result in loss of line or frame synchronism in systems of the prior art. The horizontal scanning frequency filter, including the R1, L1, C1, and V2 circuits, selects the scanning frequency by virtue of the harmonic response to the recurring regular blanking pulses, and passes a voltage as at 18, shown on a shortened time scale. The local oscillator comprising the conventional phase shifting network PH and the oscillator circuit including L4, C4, and V7 is fed from PH by way of R7, providing sustaining periodic voltages of magnitude sufficient to maintain the oscillation when the oscillatory circuit constants are adjusted to within a few cycles of synchronism. The voltages 18 thus add to the local oscillator voltages and alter the frequency thereof to coincidence only within a narrow frequency range because of the sinusoidal nature of voltages 18 and the weak coupling via R7. The resulting sinusoidal voltages 19 are phase and frequency corrected when synchronized and are employed, after amplification, for controlling the saw-tooth generator for the horizontal scan circuit of the cathode ray tube 22.

In a similar manner the vertical scanning frequency filter provides the voltage wave 20 of frame blanking frequency by way of C2, L2, and V3, and the corrected phase and frequency wave 21 is produced by the conventional phase shifter network PV, the oscillator C3—L3, V4 and V5, from the wave 20.

A conventional frequency divider may be employed, by way of switch 23, in place of the vertical scanning frequency filter and local oscillator, if desired, since the frame scanning is at a definite submultiple of the line scanning frequency.

The instant system differs from the prior art in that it does not depend upon synchronizing pulses supplied by the transmitter to control the sweeps for each line and frame. The transmitter and receiver of said system incorporate highly stable oscillators to control the horizontal and and vertical frequencies. In place of the vertical selector and oscillator circuits, a frequency dividing multivibrator or other frequency dividing device may be used when it is desired to maintain a constant ratio between the horizontal and vertical frequency. No synchronization pulses are transmitted and the line frequency oscillator in the receiver is synchronized to the line frequency oscillator in the transmitter by selecting the fundamental component of the line blanking pulses. The receiver line frequency oscillator will lock in with this component of the picture signal only when its free frequency lies within a few cycles per second of the line repetition frequency of the picture signal. Similarly, this oscillator cannot lock to a pulse jamming signal unless the jamming pulse repetition rate is within a few cycles of the oscillator frequency. The outputs of the line frequency oscillator and the multivibrator, when used in turn, control the horizontal and vertical sweep circuits. It is not intended to convey the thought that simple synchronizing pulses are not desirable in the minimizing of phase shift of the picture owing to the effect of picture components in the composite video signal.

The line frequency oscillator of my invention employs a special high Q reactor to improve its frequency stability. A 150–650 micro-microfarad mica trimmer condenser provides ample frequency adjustment to compensate for any variations in the values of the components in the tuned circuit and enables the oscillator to be adjusted exactly.

According to the present invention the composite video signal received by the television receiver is divided into two or more parts, one being the image signal and one being the line blanking pulse which is fed into the resonant circuit $L_1$—$C_1$ by way of R2. A third part, comprising frame blanking pulses or other voltages of that period, is illustrated as passing through R3 to the resonant circuit C2—L2 and the tube V3 whence it controls a frame scanning trigger circuit. The resistors R2 and R3 and tubes V1 and V3 prevent feed back of any oscillatory voltages from the resonant and oscillatory circuits to prior stages.

In the operation of the circuit, a composite signal is made up of a video signal with or without synchronizing signal plus extraneous noise or interfering signal. It is introduced through filter resistor $R_1$ to the grid of isolation amplifier $V_1$. This tube $V_1$ discriminates, amplifies and limits the composite signal leaving sufficient output to excite the selector circuits for synchronizing selection, the vertical selection circuits being omitted when a frequency dividing device is used to obtain vertical frequency.

Isolation and filter resistor $R_2$ operating in conjunction with the high Q tuned circuit, made up of $L_1$ and $C_1$, select the fundamental sine wave frequency of the line blanking voltage thus controlling the voltage at the grid of the tube V2 and consequently the output of V2, passing a substantially sinusoidal damped wave of voltage which persists by virtue of the recurring impulses from V1. The resonant frequency may be adjusted by variation of the $L_1$—$C_1$ constant to pass the desired frequency of blanking voltage.

In a like manner the isolation and filter resistor $R_3$ and the high Q tuned circuit made up of $L_2$ and $C_2$, select the fundamental sine wave frequency of the vertical blanking voltage when it is desired to synchronize the vertical frequency without use of a frequency dividing network.

These separate voltages are isolated and amplified by tubes $V_2$ and $V_3$, respectively. The tubes are operated in such a manner as to prevent undue loading of their respective tuned circuits.

The frequency discrimination as well as the "fly wheel" effect of the above circuit enhances the synchronizing selection characteristics of the system.

The output of tube $V_3$, operating through switch $S_v$, is used to influence the average frequency of the low frequency sine wave oscillator $V_4$—$V_5$. The phase shifting network $P_v$ is for convenience in framing the picture. This oscillator is of special design. It consists of tube $V_4$ which acts for the most part as an isolation amplifier to prevent undue loading of tuned circuit $L_3$ and $C_3$. Tube $V_5$ acts as a phase inverter wave shaper and supplies amplification to sustain the oscillations. The resistor $R_4$ is used to feed back sufficient energy to allow sustained oscillations to take place, but it is large enough to prevent undue loading of tuned circuit $L_3$—$C_3$. The frequency of the oscillator is determined by filtering out the 40.8 C. P. S. (cycles per second) component of the video signal and using said 40.8 C. P. S. component to synchronize the multivibrator $V_4$, $V_5$. The filtering is done by the tuned circuits $C_2$, $L_2$ and $C_3$, $L_3$, thus explaining the operation of multivibrator $V_4$, $V_5$ and the method used for synchronization. The resistor $R_5$ serves as isolation against the loading or tuning effects of the phase shifting network associated with the circuit on tuned circuit $L_3$—$C_3$, and yet it permits sufficient synchronizing energy to result in locking action of the oscillator by means of a grid or plate connection depending upon the control desired.

The output from the vertical oscillator is shaped by capacitor $C_4$ and resistance $R_6$ in conjunction with amplifier $V_6$, so that its output may be applied directly to the saw tooth generating tube in the vertical deflecting circuit.

The output containing the horizontal frequency from $V_2$ is fed through switch $S_H$ to the phase shifting network $P_H$ for framing purposes. The resistor $R_7$ serves as isolation against the loading or tuning effects of the phase shifting network associated with the circuit on tuned circuit $L_4$—$C_4$, and yet it permits sufficient synchronizing energy to result in locking action of the oscillator by means of a grid or plate connection depending upon the control desired. From resistor $R_7$ the horizontal frequency output goes to sine wave oscillator $V_7$ which has its average frequency controlled thereby. $V_8$ is an isolating amplifier and $V_9$ is a wave shaper through which the output of the oscillator must pass before it is applied directly to the saw tooth generating tube of the horizontal deflecting circuit.

The invention described herein may be manufactured and used by or for the Government of the United States of America for governmental purposes without the payment of any royalties thereon or therefor.

What is claimed is:

1. In a television receiver, means amplifying a video signal therein, means controlled by said amplified signal for deriving a line synchronizing signal including a reactance filter tuned to line frequency and an amplifier controlled thereby, a local sine wave oscillator circuit adjusted to approximate line scanning frequency; means weakly coupling said synchronizing signal into said oscillator circuit for adjusting said approximate frequency to coincidence with said line frequency, and a line scanning generator controlled by said adjusted oscillator frequency.

2. In a television receiver, means amplifying a video signal therein, a blanking frequency-controlled filter and amplifier circuit coupled to said signal means output for selecting a sine wave component of blanking frequency, a stable local sine wave oscillator loosely reactance coupled to said filter and amplifier circuit whereby the average frequency of a series of oscillations in the local oscillator is altered by said selected sine wave, means amplifying said altered average frequency for triggering a scanning voltage generator, and a vertical scanning wave generator triggered by said amplified altered frequency.

3. In a television receiver, means amplifying a video signal therein, a tuned filter and amplifier circuit connected for response to said amplified signal, said circuit being adjusted to conduct only a sine wave potential of line blanking frequency, a stable local sine wave oscillator tuned to approximate line scanning frequency, means loosely coupling said potential into the circuit of said oscillator for changing the average frequency thereof to coincidence with said scanning frequency when said frequencies nearly coincide, a second tuned filter and amplifier circuit connected for response to said amplified signal, last said circuit being adjusted to conduct a sine wave potential of frame blanking frequency, a stable local sine wave oscillator tuned to approximate frame scanning frequency, means loosely coupling last said potential into the circuit of last said oscillator for changing the average frequency thereof when said frequencies nearly coincide, a line scanning voltage generator, a frame scanning voltage generator, and means connecting said changed frequencies to said scanning voltage generators, respectively, for control thereof.

4. In a television receiver, means amplifying a composite video signal therein, a first tuned filter means selecting from said signal a periodic line blanking voltage, a second tuned filter circuit selecting from said signal a periodic frame blanking voltage, a first free-running local sine wave oscillator tuned to approximate line scanning frequency, a second free-running local sine wave oscillator tuned to approximate frame scanning frequency, means weakly coupling said periodic voltages to said local oscillators, respectively, for applying small corrections to the free-running periods thereof, means generating periodic line and frame scanning voltages, and electronic means for triggering said scanning voltage generators at said corrected periods respectively.

5. In a television receiver, means for amplifying a composite video signal, a tank circuit including an amplifier and a filter input thereto adjusted for line scanning frequency response to said amplified means, a stable free-running sine wave oscillator loosely reactance coupled to the output of said tank circuit whereby the tank circuit output mixes with the sine wave of said oscillator and controls the average frequency thereof when the respective frequencies substantially coincide, a second tank circuit and amplifier responsively coupled to the amplified composite signal for generating a sine wave signal of frame blanking frequency, a second stable free-running sine wave oscillator the average frequency of which is controlled by said frame blanking sine wave signal when the respective frequencies thereof substantially coincide, and means connecting said controlled frequencies, respectively, to line scanning and frame scanning saw-tooth generators, respectively.

JOHN EDEN BURRELL.

REFERENCES CITED

The following references are of record in the file of this patent:

UNITED STATES PATENTS

| Number | Name | Date |
|---|---|---|
| 2,231,792 | Bingley | Feb. 11, 1941 |
| 2,231,971 | Tubbs | Feb. 18, 1941 |
| 2,277,000 | Bingley | Mar. 17, 1942 |
| 2,310,197 | Hansell | Feb. 2, 1943 |